United States Patent [19]

Fothergill

[11] Patent Number: 5,081,081

[45] Date of Patent: Jan. 14, 1992

[54] STABILIZED METAL OXIDE POWDER COMPOSITION

[75] Inventor: Kevin A. Fothergill, Darlington, England

[73] Assignee: Tioxide Group PLC, London, England

[21] Appl. No.: 527,557

[22] Filed: May 23, 1990

[30] Foreign Application Priority Data

Jun. 3, 1989 [GB] United Kingdom ............... 8912838

[51] Int. Cl.$^5$ .................. C04B 35/02; C04B 35/48; C04B 35/49
[52] U.S. Cl. ...................... 501/105; 501/94; 501/102; 501/103
[58] Field of Search ............. 501/87, 88, 89, 90, 501/92, 96, 102, 103, 104, 105

[56] References Cited

U.S. PATENT DOCUMENTS

| 2,488,439 | 11/1949 | Schaumann | 23/202 |
|---|---|---|---|
| 4,145,403 | 3/1979 | Fey | 423/613 |
| 4,748,138 | 5/1988 | Watanabe et al. | 501/87 |
| 4,769,351 | 9/1988 | Soumiya et al. | 501/105 |

FOREIGN PATENT DOCUMENTS

| 013599 | 7/1980 | European Pat. Off. | 501/103 |
|---|---|---|---|
| 0257963A2 | 3/1987 | European Pat. Off. | |
| 0214291A1 | 3/1988 | European Pat. Off. | |
| 57-107904 | 12/1982 | Japan . | |
| 59-6126 | 10/1984 | Japan . | |
| 0081062 | 5/1985 | Japan | 501/103 |
| 61-291417 | 6/1985 | Japan . | |
| 59-00030 | 1/1984 | PCT Int'l Appl. | 501/102 |
| 707560 | 4/1954 | United Kingdom . | |
| 919019 | 2/1963 | United Kingdom . | |
| 989623 | 4/1965 | United Kingdom . | |
| 1010061 | 11/1965 | United Kingdom . | |
| 1035191 | 7/1966 | United Kingdom . | |
| 1058311 | 2/1967 | United Kingdom . | |
| 1169282 | 12/1969 | United Kingdom . | |
| 1339784 | 12/1973 | United Kingdom . | |
| 2204030A | 11/1988 | United Kingdom . | |

Primary Examiner—William R. Dixon, Jr.
Assistant Examiner—Michael Marcheschi
Attorney, Agent, or Firm—Banner, Birch, McKie & Beckett

[57] ABSTRACT

A composition suitable for use in the manufacture of a ceramic material comprises free-flowing substantially non-aggregated particulate zirconia. A substantial proportion of the zirconia is present in the tetragonal crystalline form and the particles of zirconia contain alumina in an amount of from 1 to 10% by weight expressed as Al on $ZrO_2$. The particles are substantially free of silica.

The particles of zirconia can be coated with an oxide or hydrous oxide of a stabilizing agent for zirconia such as an oxide or hydrous oxide of yttrium, calcium, magnesium, barium, strontium or cerium.

An oxidation process is described for the manufacture of the tetragonal crystalline zirconia by the oxidation of zirconium halide in the presence of aluminium halide at high temperature in the vapor phase.

15 Claims, 1 Drawing Sheet

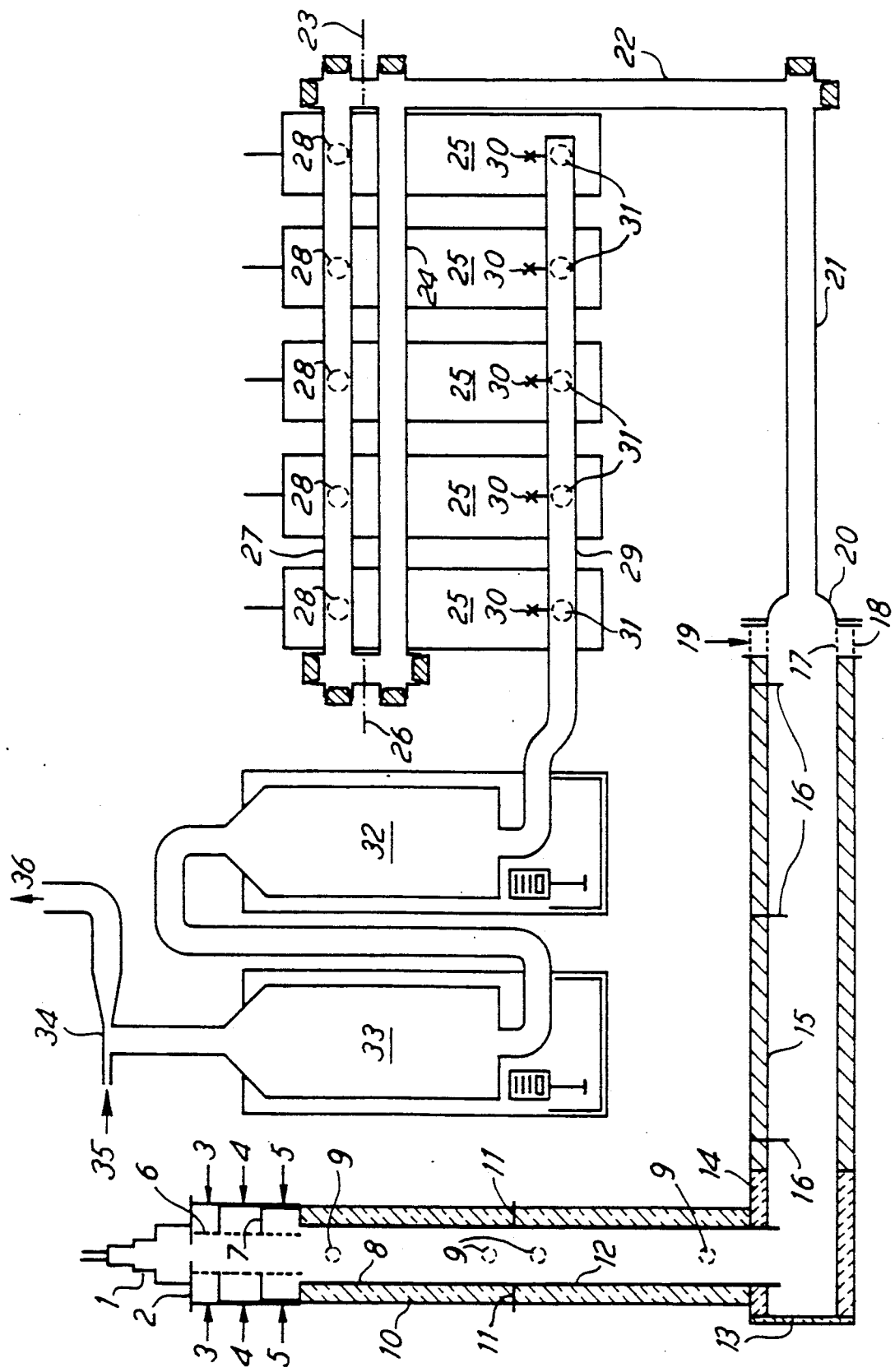

STABILIZED METAL OXIDE POWDER COMPOSITION

This invention relates to stabilized powder compositions and particularly to compositions which are suitable for the manufacture of ceramic materials.

The presence of at least some tetragonal crystalline zirconia in a zirconia ceramic is desirable and hitherto it has been necessary to fire a zirconia ceramic composition together with one or more stabilising agents so that the tetragonal form which is produced by heating monoclinic zirconia remains in the tetragonal form on cooling.

Unfired tetragonal zirconia has been reported as existing at room temperature but this has only existed either in intimate admixture with a substantial proportion of silica the presence of which is undesirable in compositions which are to be used to produce ceramics or in a highly aggregated state produced by a hydrolysis process.

A stable form of zirconia has now been obtained free of aggregation and in the tetragonal state.

According to the present invention a composition suitable for use in the manufacture of a ceramic material comprises free-flowing substantially non-aggregated particulate zirconia a substantial proportion of which is in the tetragonal crystalline form substantially free of silica and containing within the particles thereof alumina in an amount of from 1.0% to 10% by weight expressed as Al on weight of $ZrO_2$.

The compositions of the present invention are free-flowing non-fired powders of tetragonal zirconia which are of stable crystalline form at room temperature and eminently suitable for the manufacture of ceramics by firing.

The compositions of the invention are substantially free of silica the presence of which is undesirable in zirconia ceramics. Usually the amount of silica should not exceed 0.1% by weight as Si on weight of $ZrO_2$ in the particulate material and preferably less than 0.02% as Si.

The product of the invention preferably is substantially free of sodium and desirably the maximum amount of sodium is less than 300 ppm by weight as Na and most desirably less than 100 ppm as Na.

As stated hereinbefore a substantial proportion of the zirconia particles are in the tetragonal crystalline form and preferably at least 60% by weight of the zirconia is so present. Usually it is desirable that at least 80% by weight of the zirconia is present as tetragonal zirconia and, indeed, powders of at least 90% zirconia in the tetragonal form are the most useful.

The tetragonal zirconia of the present invention contains alumina the presence of which is located within the individual tetragonal particles and which ensures that the crystalline form is stable and does not revert to a monoclinic or a cubic crystalline form. Generally speaking the tetragonal crystalline form should contain at least 1.0% by weight of alumina expressed as Al on weight of $ZrO_2$ and can contain up to 10% by weight. Preferably the amount of alumina is greater than 1.5% and less than 8% as weight of Al on $ZrO_2$ and most preferably greater than 3% by weight and less than 8%.

The composition of the present invention can have a range of particle sizes but preferably the composition has a particle size such that at least 85% by weight of the particles have a diameter of less than 1 micron. Preferably the particulate zirconia has a mean size of from 0.01 micron to 0.2 micron and most preferably from 0.02 to 0.1 micron. By the term "substantially non-aggregated particulate zirconia" there is meant a composition in which at least 75% by weight of aggregated particles, and preferably at least 85%, have a size less than 1 micron. Preferably the aggregates are less than 0.5 micron and most preferably less than 0.3 micron in size.

Tetragonal zirconia in accordance with the present invention is obtained by a vapour phase oxidation process in which an oxidisable zirconium compound is oxidised in an oxygen containing atmosphere in the presence of an oxidisable aluminium compound in an amount sufficient to introduce in the product obtained the desired amount of alumina. The oxidation is carried out in the substantial absence of oxidisable silicon compound. Usually the oxidisable zirconium compound is a zirconium halide, e.g. zirconium tetrachloride and the oxidisable aluminium compound is an aluminium halide, preferably aluminium chloride.

As stated hereinbefore the composition of the invention is obtained by oxidising a zirconium halide in the presence of an aluminium halide at a high temperature in the vapour phase. Usually the oxidation is carried out at a minimum equilibrium temperature of at least 1500K, usually from 1700K to 1900K.

The oxidation reaction can be carried out at atmospheric, subatmospheric or superatmospheric pressure.

The attainment of the high oxidation temperature is most easily achieved through the use of an electrical plasma heating system in which an inert gas or oxygen is heated by passing through an electric arc between electrodes, a so-called plasma gun, which is supplied with electrical energy at such a level of power as to impart the necessary heating to the reagents prior to feeding into the reaction chamber itself.

Naturally the amount of electrical power fed into the gases depends on the actual temperature rise required and also on the other conditions associated with rates of flow and actual initial temperature levels. It would be expected that a commercially operating plant manufacturing a substantial quantity of the product would require the total input of a far greater amount of electrical energy than a laboratory or pilot plant set up. Typically at an oxidation rate of approximately 1 mole per minute an amount of energy of at least 100 kcals per mole based on total halides is employed, preferably at least 150 kcals per mole but on scale-up reduced amounts can be expected.

Since the composition of the invention should be relatively pure and free from impurities this form of heating employing electrical power is the most preferred because it avoids heating by burning fuel which can introduce objectionable impurities into sensitive reaction systems.

Whilst the composition can be used directly without any further treatment to produce ceramic it is preferable to incorporate known stabilising agents, such as, compounds of yttrium, calcium, magnesium, barium, strontium or cerium into the powder composition before shaping and firing to produce ceramics.

One particularly advantageous further treatment is to coat the particles of the free-flowing powder with an oxide or a hydrous oxide of the known stabilising agents and, preferably an inner coating of an oxide or a hydrous oxide of zirconium, of titanium or of aluminium is applied before the coating of the known stabilising agent. This initial coating provides a key for the outer coating.

The coating of the particles of the free-flowing powder usually is carried out by a wet coating process to deposit a hydrous oxide by hydrolysis of a water-soluble hydrolysable compound of the stabilising agent.

The product in accordance with the invention is particularly useful for the manufacture of ceramic bodies in which the material may be subjected to grinding if desired and mixing with any particular chosen binding agent and formed into a ceramic green body such as by moulding or any other suitable technique. The green body is then fired at an elevated temperature to produce the chosen ceramic material and typically the ceramics are fired at temperatures in the range 1200° C. to 1800° C., preferably 1300° C. to 1550° C.

One form of apparatus which may be used in the laboratory at about atmospheric pressure to manufacture the zirconia in accordance with the invention is shown in diagrammatic form in the attached drawing.

This drawing shows an electric arc plasma gun 1 mounted on a reactor head 2 formed of nickel with a barrel formed of aluminium or nickel. Below the reactor head 2 there is located a gas inlet 3 above a second gas inlet 4 which is itself mounted above a third gas inlet 5 each feeding a desired combination of gases to sets of burner rings 6 located radially inwardly of each of said inlets 3, 4 and 5. Depending on the particular conditions to be used the burner rings 6 can be formed of a suitable metal such as nickel or of a ceramic material.

The various gas inlets 3, 4 and 5 are separated by nickel or ceramic plates 7 whereby gas flow through the various inlets 3, 4 and 5 are directed radially inwardly into the innermost part of a reactor column 8 formed of silica on which the gas inlet assemblies are mounted.

The reactor column 8 is provided with a number of ports or apertures 9 through which a thermocouple may be introduced into the reactor column 8 and surrounding the reactor column 8 is thermal insulating material 10. At the bottom of the reactor column 8 there is located an annular connecting plate 11 formed of nickel which effectively connects the reactor column 8 with a similar but lower reactor column 12 formed of silica which forms the bottom section of the overall reactor. The lower reactor column 12 terminates in a discharge assembly which is provided with a removable refractory plate 13 carried on the refractory base section 14 which connects with ducting 15 formed of silica. The silica ducting 15 is equipped with a number of thermocouples 16 and has at its other end opposite the refractory plate 13 a perforated annular quench ring 17 formed of aluminium metal forming part of and carried by a housing 18 which is provided with a gas inlet 19.

The ducting is secured through a suitable adaptor 20 to a reduced diameter ducting formed of heat resistant glassware 21 and 22 which is connected to a sliding valve assembly 23. This assembly 23 is shown in its closed position across the ducting 22. Ducting 22 is joined to a further ducting 24 mounted at right angles to the ducting 22 immediately prior to the position of the sliding valve assembly 23. The ducting 24 is connected to five separated filters 25 consisting of polypropylene pots containing woven filter socks formed from polytetrafluoroethylene. Positioned at the end of ducting 24 is a further sliding valve assembly 26 leading to an inlet manifold 27 formed of polypropylene which is connected to the filter pots via inlet apertures 28.

At the other end of the filter pots 25 there is an outlet manifold 29 formed of polypropylene which is connectable via valves 30 to the outlet pipes 31 of each filter pot 25. The outlet manifold 29 is connected at its other end to a scrubbing unit 32, containing caustic soda solution or water as is appropriate, and this unit 32 is then connected to a second gas scrubbing unit 33 containing caustic soda solution. The outlet from the second gas scrubbing unit 33 is fed to a venturi type gas injector 34 which is fed by an injector gas through an inlet 35 to a stack connected to an outlet 36 so that the gas pressure in the assembly is maintained at less than ambient atmospheric pressure.

Products of the present invention are dispersed easily in water for subsequent processing and no milling or grinding is required to produce a stable dispersion.

Green bodies formed from the product of the invention have a higher density than comparable monoclinic products and subsequently exhibit less shrinkage on firing.

The invention is illustrated by the following Examples.

EXAMPLE 1

Argon gas flowing at a rate of 2 gram moles per minute was passed through the plasma torch assembly 1 of the apparatus shown in the attached drawing which was supplied with electrical energy at a voltage of 27 volts and at 540 amps to raise the temperature of the reactor and subsequent parts of the apparatus to that desired. The actual amount of power supplied to the argon gas flowing through the plasma assembly was 96 kilocalories per minute. Compressed air was fed through gas inlet 35 at a rate sufficient to reduce the pressure in the apparatus to a value of from 5 to 7.5 cms water gauge below atmospheric pressure.

Oxygen gas preheated to 600K was introduced through gas inlet 3 at rate of 3.81 moles per minute. Argon gas at a rate of 2.16 moles per minute preheated to 570K was introduced through gas inlet 4 and argon gas at a rate of 3.0 moles per minute preheated to 670K as introduced through gas inlet 5.

Preheating of the gases was achieved by passing the unheated gas over silica chips contained in a silica tube maintained at a temperature of 870K by means of electrical resistance elements.

A fluidised bed vaporiser was connected to gas inlets 4 and 5 and the fluidised bed contained sand particles which were fluidised by the passage of 0.80 moles per minute of argon gas. The bed was heated to a temperature of about 870K and the argon was introduced through gas inlets 4 and 5 into the reactor at a temperature of about 670K.

When the temperatures in the reactor columns 8 and 12 and those in the duct 15 were steady in showing no further temperature rise it was considered that the apparatus had reached a steady state in so far as temperature was concerned and a mixture of solid zirconium tetrachloride and aluminium trichloride was fed to the fluidised bed vaporiser. The proportion of zirconium tetrachloride to aluminium trichloride was 3.5 to 1 by weight and this mixture was fed to the vaporiser at a rate of 100 grams per minute. A mixture of zirconium tetrachloride, aluminium chloride and argon vapour was produced in the fluidised bed and fed to the gas inlet at a temperature of 670K.

The supply of the zirconium tetrachloride and aluminium trichloride mixture was continued for 50 minutes. The feed was then stopped and after 10 minutes all electrical power to the plasma gun assembly 1 was switched off.

Zirconium and aluminium oxides were produced through the oxidation of a mixture of zirconium and aluminium chlorides and collected in the filters 25. The equilibrium temperature of reaction was calculated to be 1770K. A total of 1545 g of mixed oxides was removed from the filters and the associated reactor pipework. The product was a free flowing white powder and was found by x-ray fluorescence analysis to contain 6.8% aluminium as Al. The crystalline phase content of the product was determined by x-ray diffraction and found to consist of 94% tetragonal zirconia. No crystalline alumina was detected. The specific surface area of the product was measured by nitrogen adsorption to be 24 $m^2/g$ corresponding to a mean crystal diameter of approximately 0.02 microns. The silicon content of the product was analysed and found to be less than 0.1% Si.

EXAMPLE 2 (COMPARATIVE)

Pure zirconium tetrachloride without any addition of aluminium trichloride was oxidised using the same equipment and experimental conditions as in Example 1.

A total of 1048 grams of zirconium oxide was removed from the filters and the associated reactor pipework. The product was a free flowing white powder and was found by x-ray fluorescence analysis to contain 0.19% aluminium as Al. The crystalline phase content of the product was determined by x-ray diffraction and found to consist of less than 1% of tetragonal phase. The specific surface area of the product was measured and found to be 15 $m^2/g$ corresponding to a mean crystal diameter of 0.04 microns. The silicon content of the product was analysed and found to be less than 0.1% Si.

EXAMPLE 3

Argon gas flowing at a rate of 5 gram moles per minute was passed through the plasma torch assembly 1 which was supplied with electrical energy at a voltage of 47 volts and 378 amps. The actual power supplied to the argon gas flowing through the plasma torch assembly was 167 kilocalories per minute. As in Example 1, the pressure in the apparatus was maintained at a value of from 5 to 7.5 cms water gauge below atmospheric pressure.

Oxygen gas preheated to 660K was introduced through gas inlet 3 at a rate of 3.81 moles per minute. Compressed air at a rate of 4.0 moles per minute preheated to 600K was introduced through gas inlet 4 and compressed air at a rate of 3.0 moles per minute preheated to 660K was introduced through gas inlet 5.

A fluidised bed vaporiser was connected to gas inlet 4 and the fluidised bed contained sand particles which were fluidised by the passage of 1.22 moles per minute of compressed air. The bed was heated to a temperature of 700K and the air was introduced through gas inlet 4 into the reactor at a temperature of about 600K.

When the temperatures in the reactor columns 8 and 12 and those in the duct were steady in showing no further temperature rise it was considered that the apparatus has reached a steady state in so far as temperature was concerned and a mixture of solid zirconium tetrachloride and aluminium trichloride was fed to the fluidised bed vaporiser. The proportion of aluminium trichloride was sufficient to give an amount of 5.0% of aluminium in the product oxide by weight and this mixture was fed to the vaporiser at a rate of 124 grams per minute. A gaseous mixture of zirconium tetrachloride, aluminium trichloride and air was produced in the fluidised bed vaporiser and fed to the gas inlet at a temperature of 660K.

The supply of zirconium tetrachloride and aluminium trichloride mixture was continued for 16 minutes. The feed was then stopped and after 10 minutes all electrical power to the plasma gun assembly 1 was switched off.

Zirconium and aluminium oxides were produced through the oxidation of a mixture of zirconium and aluminium chlorides and collected in the filters 25. The equilibrium temperature of the reaction was calculated to be 1755K. A total of 540 grams was collected from the filters. The product was a free flowing white powder and was found by x-ray fluorescence analysis to contain 5.1% of aluminium as Al. The crystalline phase content of the product was determined by x-ray diffraction and found to consist of 65% of tetragonal zirconia. The specific surface area of the product was measured by nitrogen adsorption to be 21 $m^2/g$ corresponding to a mean crystal diameter of approximately 0.03 microns. The silicon content of the product was analysed and found to be less than 0.1% Si.

EXAMPLE 4 (COMPARATIVE)

A mixture of zirconium tetrachloride and aluminium trichloride was oxidised using the same equipment and experimental conditions as Example 3. The proportion of aluminium trichloride in the mixture was sufficient to give an amount of 0.8% of aluminium as Al in the product by weight. The mixture was fed at a rate of 156 grams per minute for 20 minutes.

A total of 1400 grams was collected from the filters. The product was a free flowing white powder and was found by x-ray fluorescence analysis to contain 0.93% aluminium as Al. The crystalline phase content of the product was determined by x-ray diffraction and found to consist of 50% of tetragonal phase. The specific surface area of the product was measured and found to be 20 $m^2/g$ corresponding to a mean crystal diameter of approximately 0.03 microns. The silicon content of the product was less than 0.1% Si.

I claim:

1. A composition suitable for use in the manufacture of a ceramic material comprising free-flowing substantially non-aggregated non-sintered particulate zirconia at least 60% by weight of which is in the tetragonal crystalline form, and containing within the particles thereof alumina in an amount of 1.0% to 10% by weight expressed as Al on weight of $ZrO_2$, wherein the amount of silica is not greater than 0.1% by weight as Si on $ZrO_2$ and at least 85% of said particulate zirconia has a diameter of less than 1 micron.

2. A composition according to claim 1 in which the amount of alumina is greater than 1.5% and less than 8% by weight as Al on $ZrO_2$.

3. A composition according to claim 1 in which the proportion is at least 80% by weight of the zirconia.

4. A composition according to claim 1 in which the amount of sodium is less than 300 ppm by weight as Na.

5. A composition according to claim 1 in which said particulate zirconia has a mean size of from 0.01 to 0.2 micron.

6. A composition according to claim 1 in which at least 85% of any aggregated particles present have a size less than 1 micron.

7. A composition according to claim 1 in which a stabilising agent is present with said particulate zirconia.

8. A composition according to claim 7 in which said stabilising agent is selected from the class of compounds consisting of compounds of yttrium, calcium, magnesium, barium, strontium and cerium.

9. A composition according to claim 8 in which said stabilising agent is present as an oxide or hydrous oxide in the form of a coating on said particulate zirconia.

10. A composition suitable for use in the manufacture of a ceramic material comprising free-flowing particulate zirconia in which at least 85% by weight of any particles which are aggregated have a size less than 1 micron, in which at least 60% by weight of said particulate zirconia is present in the tetragonal crystalline phase, in which any silica present does not exceed 0.1% by weight as Si on $ZrO_2$ and which contains alumina within said particles in an amount of from 1.0% to 10% by weight expressed as Al on weight of $ZrO_2$.

11. A process for the production of a composition for use in the manufacture of a ceramic material comprising oxidising in the vapour phase an oxidisable compound of zirconium with oxygen to form a predominant amount of tetragonal zirconia in the presence of an oxidisable aluminum compound in an amount sufficient to produce alumina in an amount of from 1.0% to 10% by weight expressed as Al on weight of $ZrO_2$ produced and in the substantial absence of oxidisable silicon compound such that the amount of silica is not greater than 0.1% by weight as Si on $ZrO_2$.

12. A process according to claim 11 in which the oxidisable compound of zirconium is a zirconium halide.

13. A process according to claim 11 or 12 in which the oxidisable aluminium compound is an aluminium halide.

14. A process according to claim 11 in which the oxidation is carried out at a minimum equilibrium temperature of at least 1500K.

15. A process according to claim 11 in which an electrical plasma heating system is used to supply any necessary heat to effect the oxidation.

* * * * *